United States Patent
Brixius et al.

(10) Patent No.: US 7,014,034 B2
(45) Date of Patent: Mar. 21, 2006

(54) CONTAINER TRANSPORT SYSTEM AND CONTAINER FOR TRANSPORT OF AN ARTICLE

(75) Inventors: Wolfgang Brixius, Neunkirchen A.Br (DE); Dominik Gräfer, Dortmund-Wellinghofen (DE); Albrecht Hoene, Lappersdorf (DE); Andreas Syndikus, Burgthann (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 10/789,198

(22) Filed: Feb. 27, 2004

(65) Prior Publication Data

US 2004/0168894 A1    Sep. 2, 2004

(30) Foreign Application Priority Data

Feb. 27, 2003  (DE)  ............................... 103 08 657

(51) Int. Cl.
*B65G 35/06*  (2006.01)
(52) U.S. Cl. ................................. 198/465.1; 198/346.1
(58) Field of Classification Search ............ 198/346.1, 198/465.1, 465.2
See application file for complete search history.

(56) References Cited

U.S. PATENT DOCUMENTS

| | | | |
|---|---|---|---|
| 5,301,788 A * | 4/1994 | Hironaka et al. | 198/346.1 |
| 6,217,274 B1 * | 4/2001 | Svyatsky et al. | 414/405 |
| 6,279,721 B1 | 8/2001 | Lyngso et al. | |
| 6,494,307 B1 * | 12/2002 | Kozak et al. | 198/465.1 |
| 6,540,064 B1 * | 4/2003 | Bodewes et al. | 198/465.1 |
| 6,698,574 B1 * | 3/2004 | Frommenwiler et al. | 198/465.1 |

FOREIGN PATENT DOCUMENTS

EP    0 456 297           11/1991
EP    1 094 018 A1        4/2001

* cited by examiner

*Primary Examiner*—Gene O. Crawford
*Assistant Examiner*—Mark A. Deuble
(74) *Attorney, Agent, or Firm*—Henry M. Feiereisen

(57) ABSTRACT

A container transport system for transport of an article, in particular a baggage item, includes a container for receiving an article, with the container made of flame-resistant, wear-resistant and translucent plastic material which is stable in shape. The container has an underside which is formed with touch surfaces extending in a transport direction by which the container is advanced by a conveyor between a receiving end and a discharge end. The conveyor is provided with a guiding and/or driving engagement assembly for cooperation with the touch surfaces of the container.

16 Claims, 7 Drawing Sheets

CONTAINER TRANSPORT SYSTEM AND CONTAINER FOR TRANSPORT OF AN ARTICLE

CROSS-REFERENCES TO RELATED APPLICATIONS

This application claims the priority of German Patent Application, Serial No. 103 08 657.9, filed Feb. 27, 2003, pursuant to 35 U.S.C. 119(a)–(d), the disclosure of which is incorporated herein by reference.

BACKGROUND OF THE INVENTION

The present invention relates to a container transport system, and to a container for transport of an article, in particular a baggage item.

European patent publication no. EP 0 456 297 B1 discloses a conveying system for articles, in particular baggage, by which each baggage item is transported in a separate container. These containers are supplied to an endless conveyor which includes a plurality of interconnected running gears arranged behind one another, with each supporting a carrier plate which is tiltable to the side about a horizontal axis extending in transport direction. Provided on the carrier plate are restraining elements for detachably holding the container on the carrier plate The containers, thus secured onto the carrier plate, can be sufficiently tilted at pre-selected target sites by means of the laterally tiltable carrier plate to allow the baggage items to slide out of the containers.

In the event, baggage items must be screened to check for hazardous material, such as, e.g., explosives, during check-in procedure in air terminals, the use of containers made of metal or predominantly of metal interferes with the screening procedure. As a result, the article must be removed from the container before being screened by X-rays.

Airport baggage handling systems are known, using containers with a trough-shaped top part which is made of plastic and placed in a metallic bottom part of complementary trough-shaped configuration for protection of the container. The top part is threadably engaged with the bottom part and is provided with guide surfaces or guide pins for interaction with the conveyor. As these containers are at least partially made of metal, their use for baggage is unsuitable for screening and normally requires the baggage to be transferred beforehand.

Another type of container handling system is known under the name Crisbag™ and uses containers which are suitable for X-ray screening but lack a precise guidance system in vertical convex curves or horizontal curves. As a result, these containers are subjected to substantial wear. Moreover, this handling system is very noisy because the containers hit against guides of the conveyor system during their advance.

It would therefore be desirable and advantageous to provide an improved container transport system to obviate prior art shortcomings and to include containers which are suitable for X-ray screening, in particular for baggage items or like articles, while precisely guiding the containers in a controlled manner through the transport system in any direction, including switch zones or curved zones.

SUMMARY OF THE INVENTION

According to one aspect of the present invention, a container transport system for transport of an article, in particular a baggage item, includes a container for receiving an article, with the container defining a longitudinal axis and being made of flame-resistant, wear-resistant and translucent plastic material which is stable in shape, and with the container having an underside formed with touch surfaces extending in the transport direction, and a conveyor for advancing the container in a transport direction between at least one receiving site and at least one discharge site of the conveyor, with the conveyor having a guiding and/or driving engagement assembly for cooperation with the touch surfaces of the container.

The present invention resolves prior art problems by providing a container which is entirely made of plastic material so as to be appropriate for X-ray screening and is provided with integrated touch surfaces that enable a controlled and stable guidance of the container, without subjecting the container to wear and without generating noise, while still allowing a transport of the container in any direction within the transport system. An example of a suitable container material includes a plastic that is fireproof, dimensionally stable and wear-resistant and is made commercially available by many manufacturers, such as Bayer AG, Germany, under the trade name Bayblend FR 110 ABS/PC, GE under the trade name Cycoloy C2801, DSM under the trade name Stapron CCF202, BASF under the trade name Ultrmid C3U PA 66/6, Atofina under the trade name Rilsan MB3000 and 3001 PA11. Common to all this products is an effective ordinal number of less than 6.5, so as to be appropriate for X-ray screening.

According to another feature of the present invention, the touch surfaces can be formed by confronting sidewalls of a groove-shaped passageway which is provided in the underside of the container, wherein the sidewalls extend as mirror images of one another on both sides of the longitudinal axis for engagement of at least partial areas thereof by the engagement assembly. By forming the passageway in the container bottom, the container can be guided centrally in an optimum manner in any direction and propelled, where appropriate, while the container bottom on both sides of the passageway rests directly upon the conveyor. Typically, the conveyor may include belts, rollers or other conveying members which engage the container from below on both sides of the passageway.

According to another feature of the present invention, the sidewalls of the passageway may be outwardly curved mirror-symmetrically at a radius which corresponds to a curve radius of the conveyor, so that a greatest distance between the sidewalls is defined in mid-section of the container, wherein the engagement assembly of the conveyor bears against at least one of the sidewalls in a force-locking or form-fitting manner in a curved section, crossing or switch zone of the transport path. In this way, the container is guided in a controlled manner and advanced also in curves, switches and crossing zones. As an alternative, the sidewalls of the passageway may be inwardly curved mirror-symmetrically at a radius which corresponds to a curve radius of the conveyor, thereby defining a smallest distance between the sidewalls in mid-section of the container, wherein the engagement assembly of the conveyor bears against at least one of the sidewalls in a force-locking or form-fitting manner in a curved section, crossing or switch zone of the transport path. In either case, the engagement assembly bears on one of both sidewalls of the passageway in the regions of curved transport paths to advance and guide the container through the curve or switch.

According to another feature of the present invention, the sidewalls of the passageway may have a configuration to conform to a width of the engagement assembly in leading and trailing zones of the passageway, as viewed in transport direction, wherein the sidewalls extend steadily outwards to form a funnel-shaped configuration of the passageway in the leading and trailing zones. This expansion is geometrically required for initiating a curved travel of the container. By conforming the distance of the sidewalls of the passageway to the engagement assembly, frictional engagement of the engagement assembly in the passageway is ensured and the container can be advanced in a form-fitting or force-locking manner.

According to another feature of the present invention, the sidewalls of the passageway may extend perpendicular to the underside of the container. As a consequence, the engagement assembly is oriented vertically for abutment against regions of these sidewalls. During X-ray screening of the container, the vertical edges of the sidewalls appear, however, as linear shades on a monitor so that identification of the baggage content may become difficult. Therefore, it is currently preferred to configure the sidewalls and also the edges of the container at an inclination to the screening plane. In particular, the sidewalls of the passageway may be positioned as mirror images in inclined relationship to form a configuration of the passageway in downwardly expanding direction.

According to another feature of the present invention, the container has a topside intended for receiving the article and constructed in symmetry to the longitudinal axis in the form of a trough which is curved downwards. In this way, the article can be securely held by the container.

According to another feature of the present invention, each of the touch surfaces of the passageway may be provided with at least one step extending in longitudinal direction of the passageway adjacent to a base of the passageway, thereby defining a base-distal sidewall which is curved at a radius in correspondence to a curve radius of the transport path and extending in parallel relationship to the transport direction, and a base-proximal sidewall, wherein the base-proximal sidewall of one of the touch surfaces and the base-proximal sidewall of the other one of the touch surfaces are spaced from one another at a distance which is suited to a width of the engagement assembly. The provision of the step enables an optimum guidance during travel along a curve as well as during straight travel of the container. The lower step in the base of the passageway is hereby provided to guide the container during straight travel and may have parallel sidewall zones, whereas the passageway-proximal step may be curved inwards or outwards in correspondence of the curve radius so as to enable the engagement assembly to bear against at least one of the side surfaces.

According to another feature of the present invention, the engagement assembly may include cantilevered beveled or cylindrical rollers which engage the passageway and are disposed behind one another in the transport direction at least in one row, with each of the rollers bearing at least against one of the sidewalls of the passageway. In order to realize a reliable guidance and a respective propulsion, the rollers can be arranged in a circular path, when the rollers engage a curved section of the conveyor, wherein the circular path is defined by a radius center point which is located on an axis which extends through a radius center of the curved section and a radius center of one of the sidewalls of the passageway.

According to another feature of the present invention, the engagement assembly may include two rows of bevel wheels in a curved section of the conveyor, which are so disposed that prolongations of the cone axes of all bevel wheels of one row and prolongations of their conical flanks intersect in one point which is located on a curve center point axis on which also a point of intersection of the bevel wheels of the other row is located. In this way, the driving power can be applied free of slip and in a mechanically optimum manner, while realizing a reliable guidance of the container.

According to another feature of the present invention, the engagement assembly may include two rows of rollers in a curved section of the conveyor, with each of the rows of rollers defined by a surface line extending on a circular path in parallel relationship to at least one of the sidewalls, with at least one of the rows of rollers being wrapped by a driving belt which rests against one of the sidewalls, while the other one of the rows of rollers is in contacting relationship, at least along areas thereof, with the other one of the sidewalls.

According to another aspect of the present invention, a container for use in a container transport system for transport of an article includes a main body having at least one closed hollow space. The hollow space of the main body may be foamed and/or filled with a fire extinguishing substance. By foaming the hollow space, any noise generated by the conveyor is damped and the risk of fire is decreased.

According to another feature of the present invention, the main body has outer edges for arrangement of metal elements for interaction with inductive proximity sensors installed along the transport path. These sensors allow that the position of each container in the transport system can be identified at any time, without interfering with the screening operation of the container.

According to another feature of the present invention, plural transponders may be provided which are placed in the main body outside a visual zone of the screening system for reliable and effective identification of the container. These transponders may suitably be masked by a metal cover for protection from irradiation by X-rays.

A container according to the present invention can be subjected to X-rays without any problems while so configured to allow a controlled guidance along the transport path. Noise emission is low as a result of the precise guidance of the container and may even be further reduced by foaming any hollow spaces of the container. Also wear is minimized by the manner in which the container is guided and advanced along the transport system.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1a is a bottom and side perspective illustration of the container of FIG. 1;

FIG. 3a is a bottom and side perspective illustration of the container of FIG. 3;

FIG. 6a is a bottom and side perspective illustration of the container of FIG. 6;

DETAILED DESCRIPTION OF PREFERRED EMBODIMENTS

Figure 1:
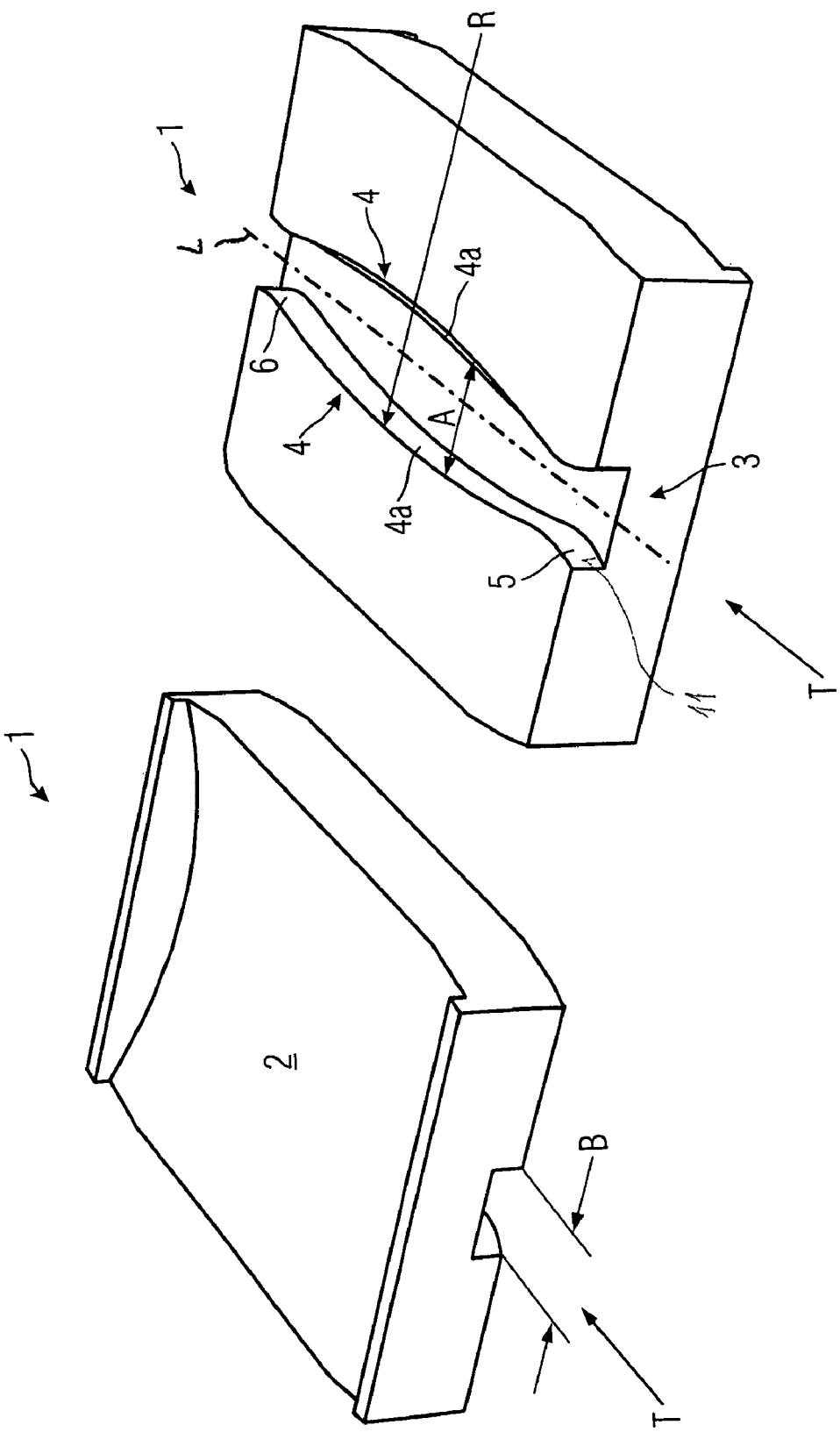
FIG. 1 is a top and side perspective illustration of a first embodiment of a container according to the present invention.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a top and side perspective illustration of a first embodiment of a container according to the present invention, generally designated by reference numeral 1, for transport of a baggage item along a baggage transport system in an airport. The container 1 has a topside with an inwardly arched surface 2 which receives the baggage item and holds it securely and stably, as the container 1 is moved by the baggage transport system, even along curved sections. FIG. 1a shows the container 1 from below and it can be seen that the container 1 has touch surfaces 4 for cooperation with a guiding and/or driving engagement assembly 4b of a conveyor, shown schematically in more detail in FIG. 2. The container 1 has a container bottom which has formed therein a passageway 3 in the form of a groove. The passageway 3 is bounded by sidewalls 4a of the touch surfaces 4 in mirror-symmetrical relationship to the longitudinal axis L of the container 1. The sidewalls 4a are outwardly curved at a radius which corresponds to a curve radius R of the curved section of the conveyor so as to define between the sidewalls 4a a greatest distance A approximately in mid-section of the container 1. In the leading and trailing zones 5, 6, as viewed in transport direction T, the sidewalls 4a are spaced from one another at a clear distance B (FIG. 1) which is suited to a width of the engagement assembly 4b in engagement there.

As shown in particular in FIG. 1a, the passageway 3 widens gradually outwards to exhibit a funnel-shaped expansion 11 in the leading and trailing zones 5, 6.

The container 1 is made entirely of a dimensionally stable, wear-resistant, flame-inhibiting plastic material that can be exposed to a baggage screening process such as X-ray screening. Although this type of plastic for the container is the currently preferred material, it is, of course, also conceivable within the scope of the invention to use a respective wood material.

Figure 2:
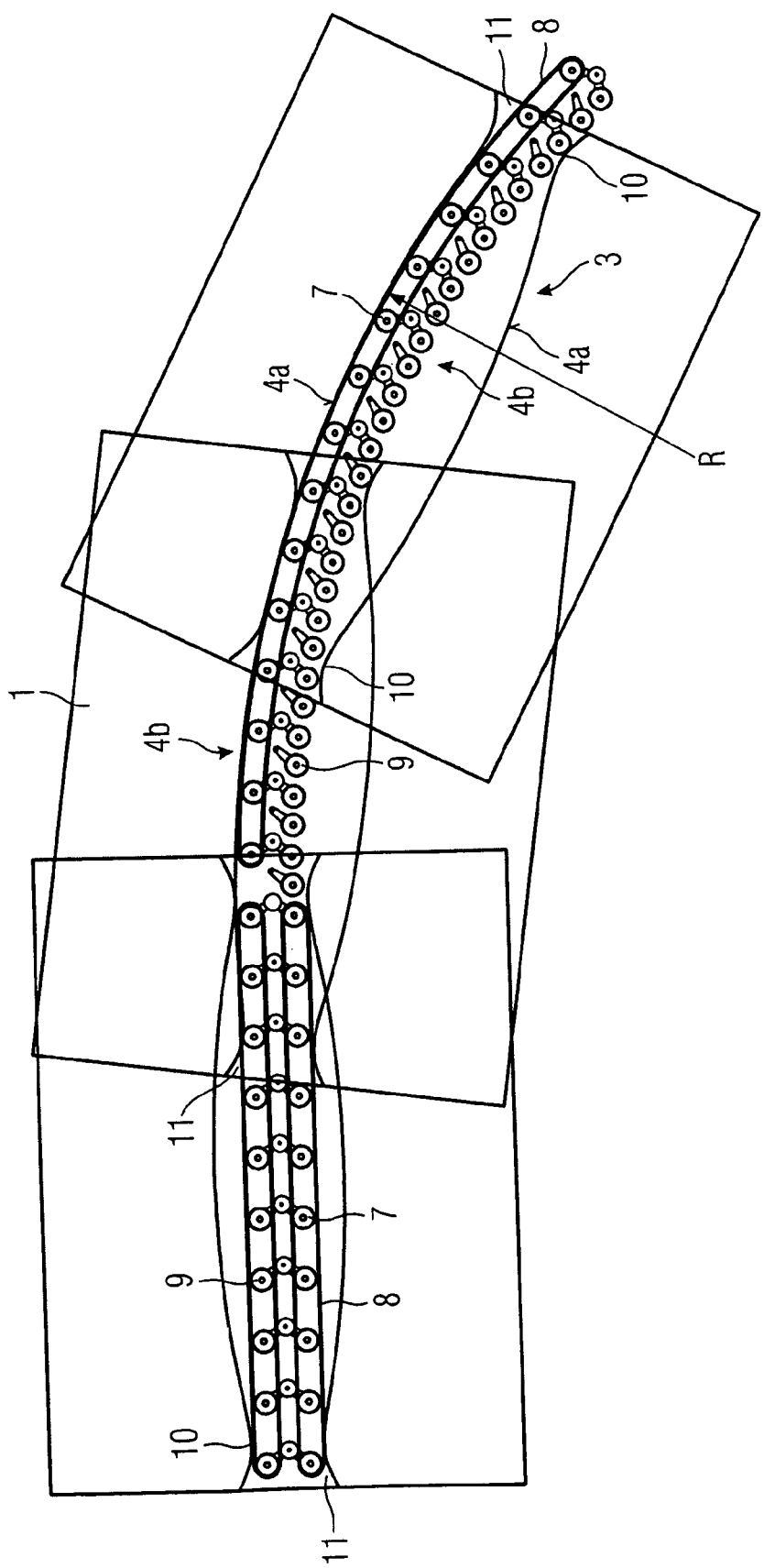
FIG. 2 is a schematic illustration of a transport system from below for advancing the container along a curved section of a container transport system according to the present invention.

Turning now to FIG. 2, there is shown a schematic representation of the transport system from below for advancing the container 1 along a curved section for illustration of the drive and movement pattern of the container 1. FIG. 2 depicts hereby three container positions which the container 1 travels successively. The engagement assembly 4b has two rows of driving and guide rollers 7, 9 which are arranged to conform to the curve radius R of the curved section of the conveyor, whereby the rollers 7 are driving rollers, while the rollers 9 are guide rollers. A drive belt 8 is wrapped about the driving rollers 7 in the curved section and is able to bear against the outer sidewall 4a of the passageway 3. The guide rollers 9 on the opposite side push the drive belt 8 through application of a counterforce and are supported adjacent to the leading and trailing zones 5, 6 in areas 10 of the passageway 3.

FIG. 2 further shows on the left-hand side a similar driving mechanism for travel of the container 1 in straight direction, with drive belts 8 wrapped around driving rollers 7 as well as guide rollers 9, and supported on both sides on the sidewalls 4a of the passageway 3 in the areas 10. The funnel-shaped expansions 11 in the leading and trailing zones 5, 6 of the passageway 3 are defined by a radius which corresponds to the radius of the engagement assembly 4b.

Figure 3:
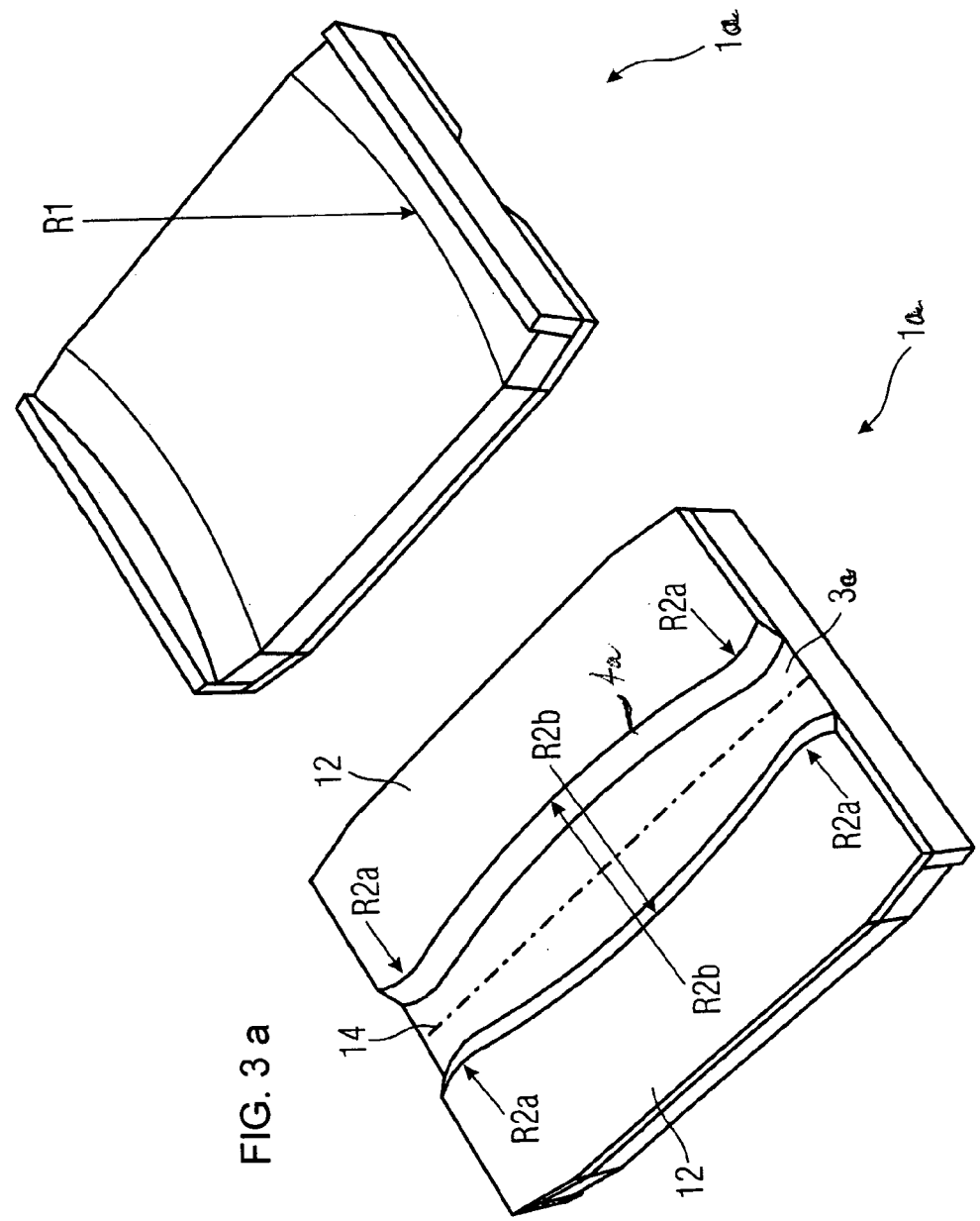
FIG. 3 is a top and side perspective illustration of a second embodiment of a container according to the present invention.

Turning now to FIG. 3, there is shown a top and side perspective illustration of a second embodiment of a container according to the present invention, generally designated by reference numeral 1a. The topside of the container 1a for receiving a baggage item is inwardly arched at a radius R1. The underside of the container 1a, as shown in FIG. 3a, has a groove-shaped passageway 3a which is configured to define a force introduction surface for transmitting kinetic energy and to absorb guiding forces for the horizontal and vertical guidance. The container underside has outer flat regions 12 which rest on conveyor portions (not shown) in the form of transport belts, transport rollers or ball-type guides. The sidewalls 4a of the passageway 3a are outwardly inclined in relation to the vertical in mirror-symmetric relationship to the longitudinal axis 14 of the container 1a. Radii R2b describe the course of the edges of the passageway 3a in the area between the funnel-shaped expansions 11, whereas radii R2a describe the course of the funnel-shaped expansions 11 and are conducive to realize an entry of the container 1a with little noise and little wear into the curved section. The bulbed zone of the sidewalls 4a, as defined by the radii R2b, provides in the curved section the counter surface to the opposite areas R2a. In other words, as best seen in combination with FIG. 2, while the rollers 7 bear upon the sidewall 4a, the rollers 9 bear upon the opposite sidewall 4a in the area 10 of the expansions 11.

Unlike the container 1 of FIG. 1, the sidewalls 4a of the container 1a are inclined. This is advantageous because the edges of the sidewall 4a are not reproduced during a screening operation, as would be the case when the sidewall extends in vertical alignment.

Figure 4:
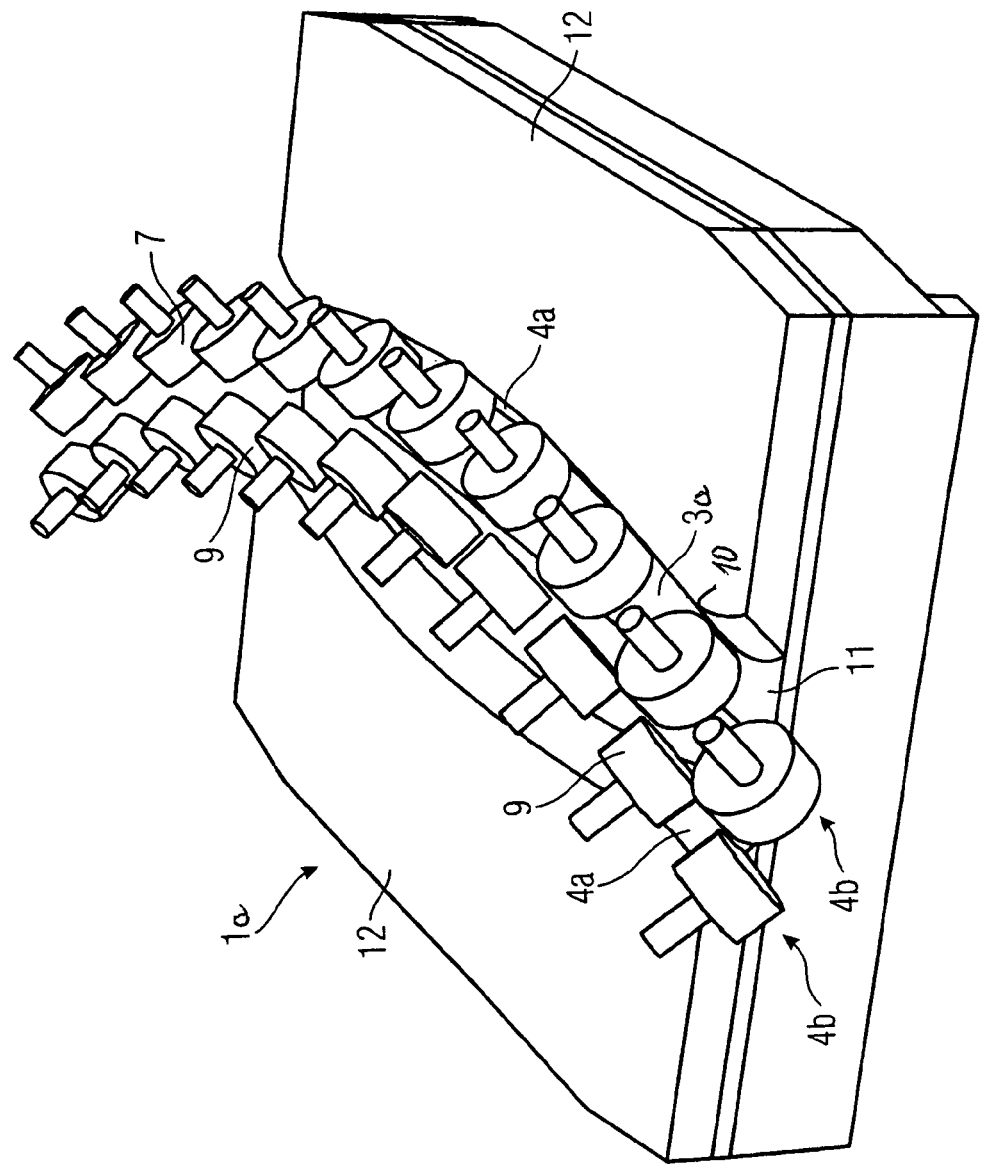
FIG. 4 is a schematic bottom and side perspective view, on an enlarged scale, of the container of FIG. 3 in cooperation with a guiding and/or driving engagement assembly of a container transport system according to the present invention.

Referring now to FIG. 4, there is shown a schematic bottom and side perspective view, on an enlarged scale, of the container 1a in the curved section of a transport path. The container 1a is engaged by the driving and/or guide rollers 7, 9 of the engagement assembly 4b, whereby the driving rollers 7 and the guide rollers 9 are arranged in two parallel rows. In the example of a curved section as shown in FIG. 4, the driving rollers 7 bear hereby upon the right-hand sidewalls 4a of the passageway 3 for advancing the container 1, whereas the guide rollers 9 bear on the left-hand sidewall 4a in FIG. 4 only in the areas 10 adjacent to the funnel-shaped expansions 11 of the passageway 3, so as to ensure that the driving rollers 7 are pressed against the right-hand sidewall 4a of the passageway 3.

As further shown in FIG. 4, the sidewalls 4a expand downwards, i.e., the sidewalls 4a are inclined outwards in relation to the vertical to prevent an imaging of the edges as a line on a monitor (not shown), as the container 1a is screened. The flat surfaces 12 on both sides of the passageway 3 form a support during transport of the container 1a upon wheels, rollers or like conveying members.

The driving and/or guide rollers 7, 9, as shown schematically in FIGS. 2 and 4 are preferably configured as bevel wheels, whereby the container 1, 1a is pressed against the bevel wheels by its weight force. The bevel wheels are driven, at least partly, and disposed in the curved section of the conveyor in a manner shown in FIG. 4.

Figure 5:
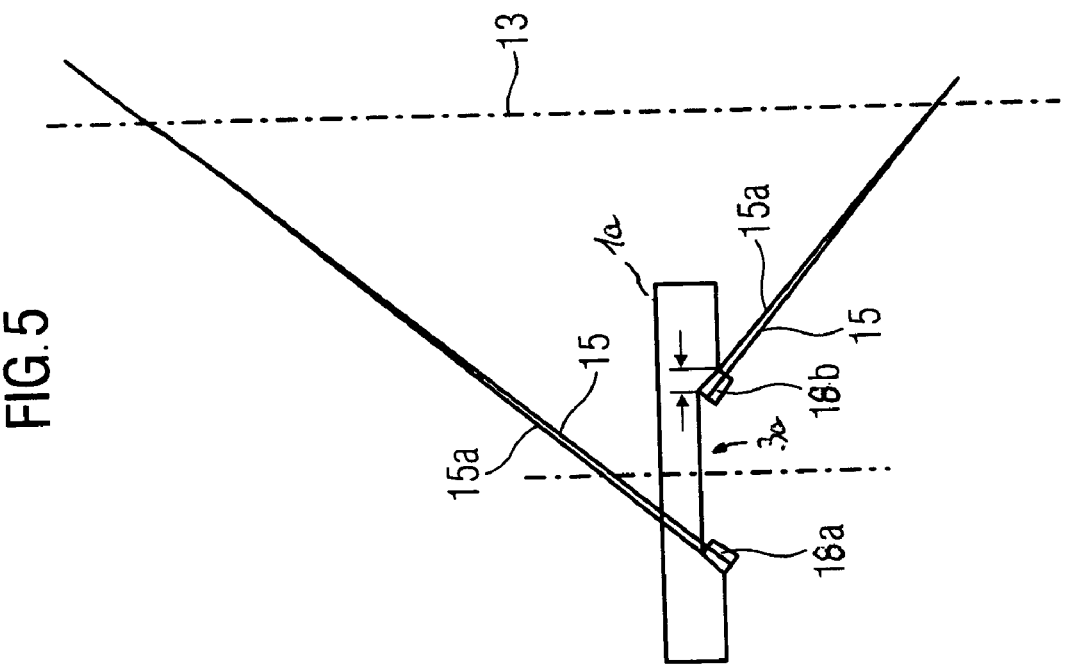
FIG. 5 is a schematic illustration of a geometric arrangement of the engagement assembly with bevel wheels.

Referring now to FIG. 5, there is shown a schematic illustration of a geometric arrangement of the engagement assembly 4b with rollers 7, 9 in the form of bevel wheels, designated here by reference numeral 18a and 18b for interaction with the container, such as container 1a, in a curved section of the transport system. The container 1a travels hereby into the drawing plane about an axis 13 through the curve center and rolls upon the bevel wheels 18a, 18b. In order to fulfill the rolling conditions, when a right-hand curve is involved, the bevel wheel 18a is positioned to expand downwards, whereas the bevel wheel 18b is positioned to expand upwards, thereby respectively defining cone axes 15. The prolongation of the cone axes 15 intersect with the prolongation of the cone flanks 15a in the curve center axis 13. In a left-hand curve, the conditions are reversed. In other words, the transport system has an engagement assembly 4b with a bevel wheel 18a which is positioned to expand upwards, and a bevel wheel 18b which is positioned to expand downwards. When conveying the container along a straight line, the transport system has an engagement assembly 4b with rollers 7, 9 in the form of cylindrical wheels to satisfy the rolling conditions for straight travel. By designing the driving and/or guide rollers 7, 9 in this way, a precise guidance of the containers is ensured.

Figure 6:
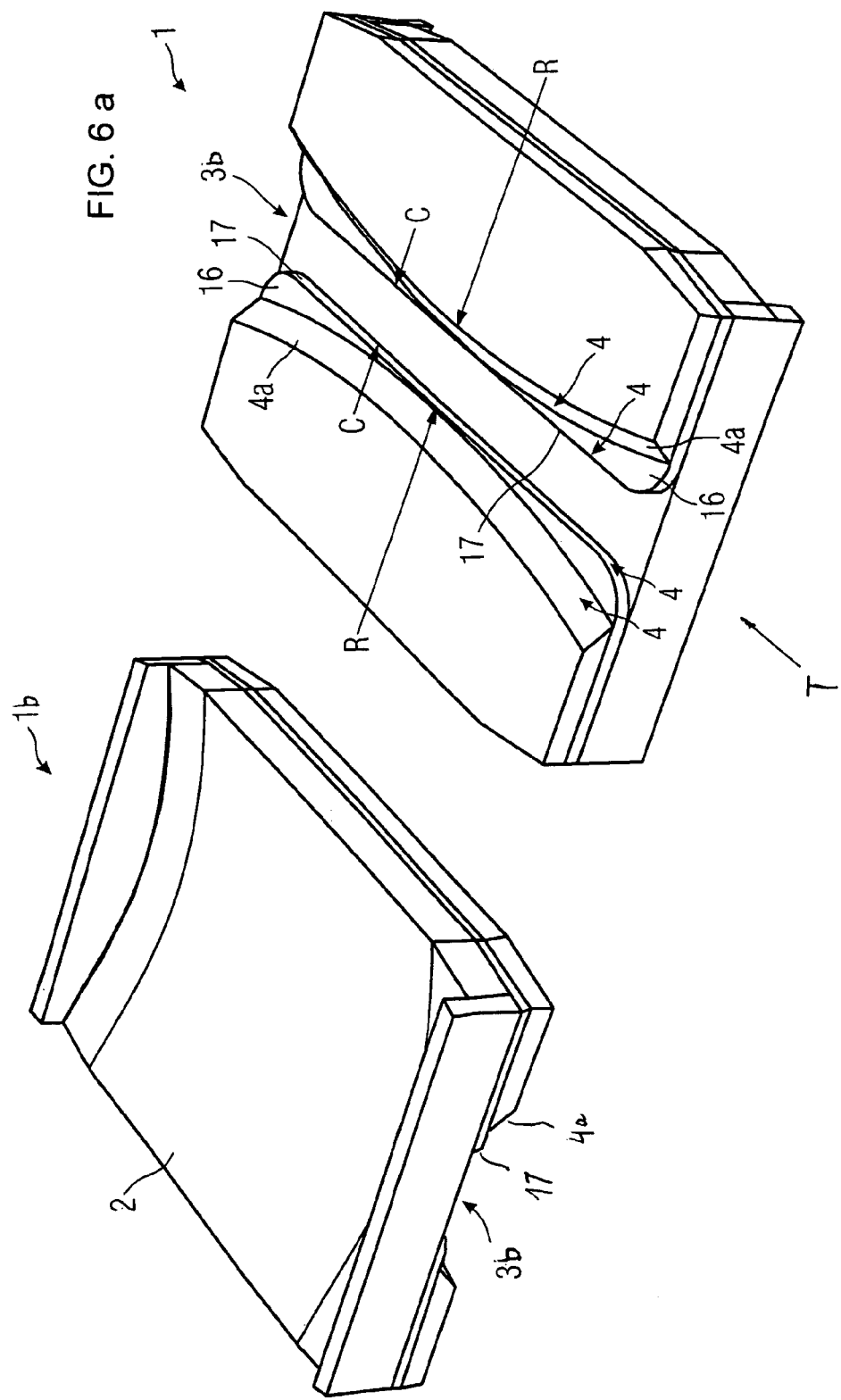
FIG. 6 is a top and side perspective illustration of a third embodiment of a container according to the present invention.

FIG. 6 shows a top and side perspective illustration of another embodiment of a container according to the present invention, generally designated by reference numeral 1b. The description below will center on the differences between the embodiments. In this embodiment, as shown in particular in FIG. 6a, the container 1b has a groove-shaped passageway 3b, bounded by mirror-symmetrical touch surfaces 4. Each of the touch surfaces 4 is of stepped configuration with an inclined sidewall 4a which ends in a step 16. The step 16 extends in longitudinal direction of the passageway 3b and has a sidewall portion 17 adjacent to the base of the passageway 3b in parallel relationship to the transport direction T. The base-distal sidewalls 4a are each curved at the radius R which corresponds to the curve radius of the conveyor. The confronting sidewalls 4a of the touch surfaces 4 are spaced from one another by a distance C which is suited to the width of the engagement assembly 4b. At operation of the transport system, the sidewalls 4a of the passageway 3b assume the guidance and propulsion of the container 1b in the curved section, as the rollers 7, 9, in twin-row disposition, bear with one side upon the respective sidewall 4a, depending whether a right-hand or left-hand curve is involved, while the base-proximal sidewall portions 17 assume the guidance of the container 1b during straight travel.

Figure 7:
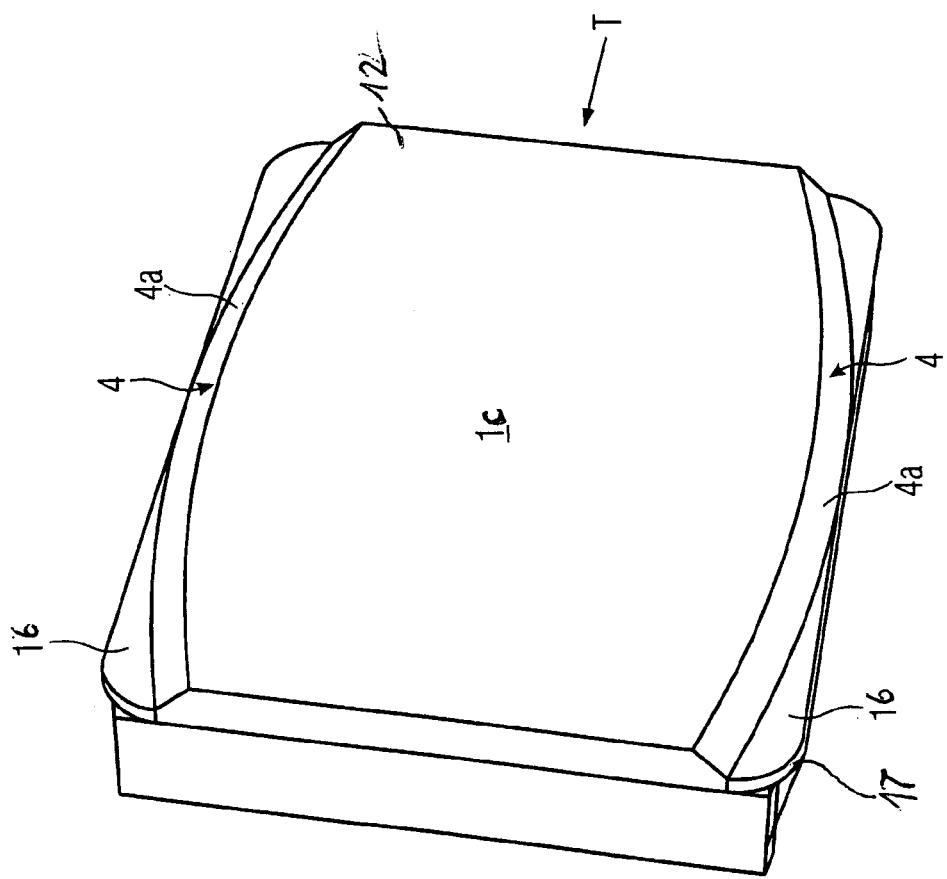
FIG. 7 is a top and side perspective illustration of a fourth embodiment of a container according to the present invention.
Figure 8:
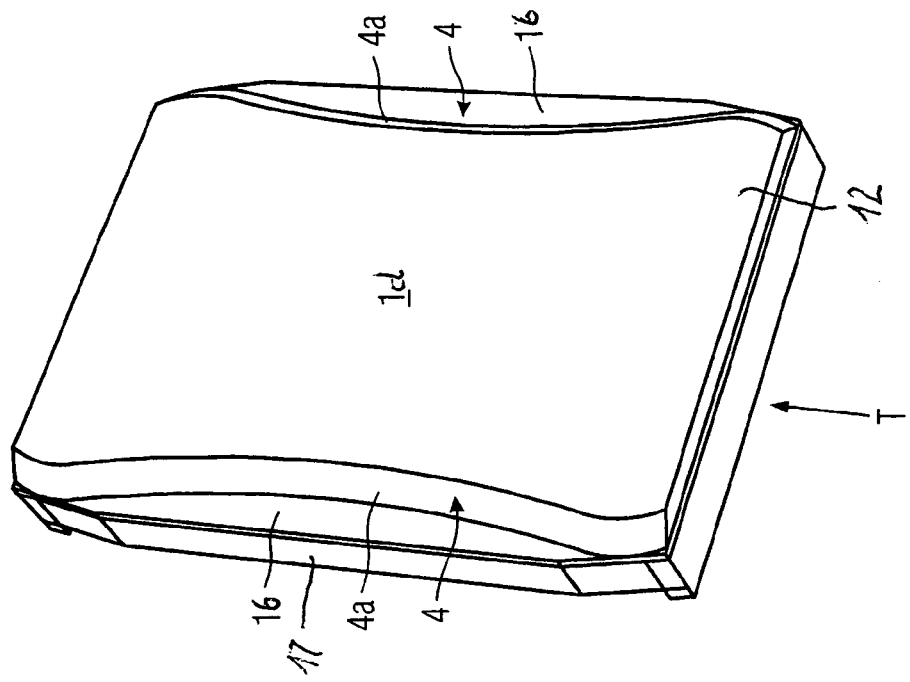
FIG. 8 is a top and side perspective illustration of a fifth embodiment of a container according to the present invention.

Turning now to FIG. 7, there is shown a top and side perspective illustration of another embodiment of a container according to the present invention, generally designated by reference numeral 1c. Parts corresponding with those in FIG. 6a are denoted by identical reference numerals and not explained again. The description below will center on the differences between the embodiments. In this embodiment, the groove-shaped passageway in the middle of the container is effectively kinematically reversed. The container 1c is formed here with touch surfaces 4 which are also designed of stepped-shaped configuration but are disposed at the lateral margins in symmetric relationship, when viewed in transport direction T. Thus, each of the touch surfaces 4 has an inclined sidewall 4a which ends in a step 16 with sidewall portion 17. The inclined sidewalls 4a assume guiding and propulsion functions for the container 1c in the curved section, while the sidewall portions 17 assume the guidance of the container 1c during straight travel. The rollers 7, 9 of the engagement assembly 4b are hereby disposed in spaced-apart relationship on both sides of the container 1c. Depending on which of the rollers 7, 9 assume the propulsion of the container 1c when traveling through a curved section, the sidewalls 4a are either curved convexly, as shown in FIG. 7, or concavely, as shown in FIG. 8 with respect to container 1d, so that the rollers 7, 9 of the engagement assembly 4b bear upon the container 1 in the inner side or outer side of the curve, with the plane bottom surface 12 resting upon the conveyor.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A transport system for transport of an article, in particular a baggage item, comprising:

a container for receiving an article, said container defining a longitudinal axis and being made of flame-resistant, wear-resistant and translucent plastic material which is stable in shape, said container having an underside formed with touch surfaces extending in the transport direction; and a conveyor for advancing the container in a transport direction between at least one receiving site and at least one discharge site of the conveyor, said conveyor having a guiding and/or driving engagement assembly for cooperation with the touch surfaces of the container, wherein the touch surfaces are formed by confronting sidewalls of a groove-shaped passageway provided in the underside of the container as mirror images of one another on both sides of the longitudinal axis for engagement of at least partial areas thereof by the engagement assembly, wherein the sidewalls of the passageway are outwardly curved mirror-symmetrically at a radius which corresponds to a curve radius of the conveyor, thereby defining a greatest distance between the sidewalls in mid-section of the container, wherein the engagement assembly of the conveyor bears against at least one of the sidewalls in a force-locking or form-fitting manner in a curved section, crossing or switch zone of the conveyor.

2. The transport system of claim 1, wherein the sidewalls of the passageway extend perpendicular to the underside of the container.

3. The transport system of claim 1, wherein the container has a topside intended for receiving the article and constructed in symmetry to the longitudinal axis in the form of a trough which is curved downwards.

4. The transport system of claim 1, wherein the engagement assembly includes cantilevered beveled or cylindrical rollers engaging the passageway and disposed behind one another in the transport direction at least in one row, with each of the rollers bearing at least against one of the sidewalls of the passageway.

5. The transport system of claim 4, wherein the rollers are arranged along a circular path in a curved section of the conveyor, wherein the circular path is defined by a radius center point which is located on an axis which extends through a center point of the curved section and a radius center point of one of the sidewalls of the passageway.

6. The transport system of claim 5, wherein the engagement assembly includes two rows of bevel wheels in a curved section of the conveyor, which are so disposed that prolongations of their cone axes of the bevel wheels of one row and prolongations of their conical flanks intersect in one point which is located on a curve center point axis on which also a point of intersection of the bevel wheels of the other row is located.

7. A transport system for transport of an article, in particular a baggage item, comprising:
    a container for receiving an article, said container defining a longitudinal axis and being made of flame-resistant, wear-resistant and translucent plastic material which is stable in shape, said container having an underside formed with touch surfaces extending in the transport direction; and
    a conveyor for advancing the container in a transport direction between at least one receiving site and at least one discharge site of the conveyor, said conveyor having a guiding and/or driving engagement assembly for cooperation with the touch surfaces of the container,
    wherein the touch surfaces are formed by confronting sidewalls of a groove-shaped passageway provided in the underside of the container as mirror images of one another on both sides of the longitudinal axis for engagement of at least partial areas thereof by the engagement assembly,
    wherein the sidewalls of the passageway are inwardly curved mirror-symmetrically at a radius which corresponds to a curve radius of the conveyor, thereby defining a smallest distance between the sidewalls in mid-section of the container, wherein the engagement assembly of the conveyor bears against at least one of the sidewalls in a force-locking or form-fitting manner in a curved section, crossing or switch zone of the conveyor.

8. The transport system of claim 7, wherein the sidewalls of the passageway extend perpendicular to the underside of the container.

9. The transport system of claim 7, wherein the container has a topside intended for receiving the article and constructed in symmetry to the longitudinal axis in the form of a trough which is curved downwards.

10. The transport system of claim 7, wherein the engagement assembly includes cantilevered beveled or cylindrical rollers engaging the passageway and disposed behind one another in the transport direction at least in one row, with each of the rollers bearing at least against one of the sidewalls of the passageway.

11. The transport system of claim 10, wherein the rollers are arranged along a circular path in a curved section of the conveyor, wherein the circular path is defined by a radius center point which is located on an axis which extends through a center point of the curved section and a radius center point of one of the sidewalls of the passageway.

12. The transport system of claim 11, wherein the engagement assembly includes two rows of bevel wheels in a curved section of the conveyor, which are so disposed that prolongations of their cone axes of the bevel wheels of one row and prolongations of their conical flanks intersect in one point which is located on a curve center point axis on which also a point of intersection of the bevel wheels of the other row is located.

13. A transport system for transport of an article, in particular a baggage item, comprising:
    a container for receiving an article, said container defining a longitudinal axis and being made of flame-resistant, wear-resistant and translucent plastic material which is stable in shape, said container having an underside formed with touch surfaces extending in the transport direction; and
    a conveyor for advancing the container in a transport direction between at least one receiving site and at least one discharge site of the conveyor, said conveyor having a guiding and/or driving engagement assembly for cooperation with the touch surfaces of the container,
    wherein the touch surfaces are formed by confronting sidewalls of a groove-shaped passageway provided in the underside of the container as mirror images of one another on both sides of the longitudinal axis for engagement of at least partial areas thereof by the engagement assembly,
    wherein the sidewalls of the passageway are positioned as mirror images in inclined relationship to form a configuration of the passageway in downwardly expanding direction.

14. A transport system for transport of an article, in particular a baggage item, comprising:
    a container for receiving an article, said container defining a longitudinal axis and being made of flame-resistant, wear-resistant and translucent plastic material which is stable in shape, said container having an underside formed with touch surfaces extending in the transport direction; and
    a conveyor for advancing the container in a transport direction between at least one receiving site and at least one discharge site of the conveyor, said conveyor having a guiding and/or driving engagement assembly for cooperation with the touch surfaces of the container,
    wherein the touch surfaces are formed by confronting sidewalls of a groove-shaped passageway provided in the underside of the container as mirror images of one another on both sides of the longitudinal axis for engagement of at least partial areas thereof by the engagement assembly,
    wherein each of the touch surfaces of the passageway is provided with at least one step extending in longitudinal direction of the passageway adjacent to a base of the passageway, thereby defining a base-distal sidewall which is curved at a radius in correspondence to a curve radius of the transport path and extending in parallel relationship to the transport direction and a base-proximal sidewall, wherein the base-proximal sidewall of one of the touch surfaces and the base-proximal sidewall of the other one of the touch surfaces are spaced from one another at a distance which is suited to a width of the engagement assembly.

15. A transport system for transport of an article, in particular a baggage item, comprising:

a container for receiving an article, said container defining a longitudinal axis and being made of flame-resistant, wear-resistant and translucent plastic material which is stable in shape, said container having an underside formed with touch surfaces extending in the transport direction; and a conveyor for advancing the container in a transport direction between at least one receiving site and at least one discharge site of the conveyor, said conveyor having a guiding and/or driving engagement assembly for cooperation with the touch surfaces of the container, wherein the touch surfaces are formed by confronting sidewalls of a groove-shaped passageway provided in the underside of the container as mirror images of one another on both sides of the longitudinal axis for engagement of at least partial areas thereof by the engagement assembly, wherein the engagement assembly includes two rows of rollers in a curved section of the conveyor, each of the rows of rollers defined by a surface line extending on a circular path in parallel relationship to at least one of the sidewalls, and further comprising a driving belt wrapped around at least one of the rows of rollers and resting against one of the sidewalls, while the other one of the rows of rollers is in contacting relationship, at least along areas thereof, with the other one of the sidewalls.

16. A transport system for transport of an article, in particular a baggage item, comprising:

a container for receiving an article, said container defining a longitudianl axis and being made of flame-resistant, wear-resistant and translucent plastic material which is stable in shape, said container having an underside formed with touch surfaces extending in the transport direction; and a conveyorr for advancing the container in a transport direction between at least one receiving site and at least one discharge sitre of the conveyor, said conveyor having a guiding and/or driving engagement assemby for cooperation with the touch surfaces on the container, wherein the touch surfaces are formed by confronting sidewalls of a groove-shaped passageway provided in the underside of the container as mirror images of one another on both sides of the longitudinal axis for engagement of at least partial areas thereof by the engagement assembly, wherein the sidewalls of the passageway have a configuration to conform to a width of the engagement assembly in leading and trailing zones of the passageway, as viewed in transport direction, wherein the sidewalls extend steadily outwards to form a funnel-shaped configuration of the passageway in the leading and trailing zones.

* * * * *